United States Patent [19]

Batzar

[11] Patent Number: 4,687,708

[45] Date of Patent: Aug. 18, 1987

[54] HIGH BUILD FLUOROCARBON POLYMER DISPERSIONS AND THEIR PREPARATION

[75] Inventor: Kenneth Batzar, Cherry Hill, N.J.

[73] Assignee: E. I. Du Pont de Nemours and Company, Wilmington, Del.

[21] Appl. No.: 878,830

[22] Filed: Jun. 26, 1986

[51] Int. Cl.$^4$ .................. B32B 27/28; B05D 3/02; C08K 3/08
[52] U.S. Cl. .................. 428/339; 427/385.5; 427/42 L; 525/326.2; 526/206
[58] Field of Search .............. 525/326.2; 526/206; 524/440; 427/385.5, 42 L; 428/339

[56] References Cited

U.S. PATENT DOCUMENTS

| | | | |
|---|---|---|---|
| 3,085,083 | 4/1963 | Schreyer | 525/326.2 |
| 3,635,926 | 1/1972 | Gresham | 526/206 |
| 3,642,742 | 2/1972 | Carlson | 526/206 |
| 3,929,721 | 12/1975 | Leverett | 524/440 |
| 4,321,177 | 3/1982 | Wilkinson | 524/375 |
| 4,599,386 | 7/1986 | Carlson et al. | 525/326.2 |

*Primary Examiner*—Thurman K. Page

[57] ABSTRACT

An aqueous dispersion of a melt processible, non-elastomeric copolymer of 80 to 99.5 mole percent tetrafluoroethylene and 0.5 to 20 mole percent perfluoro(n-propyl vinyl ether) and its preparation by gelling, drying, grinding and fluorinating the polymerization medium is disclosed.

6 Claims, No Drawings

HIGH BUILD FLUOROCARBON POLYMER DISPERSIONS AND THEIR PREPARATION

FIELD OF THE INVENTION

The present invention relates to aqueous dispersions of ground particles of copolymers of tetrafluoroethylene and perfluoropropylvinylether which particles have been fluorinated before grinding for use as coatings and the preparation thereof.

SUMMARY OF THE INVENTION

The present invention involves a process for treating a thermoplastic copolymer of tetrafluoroethylene and perfluoropropylvinyl ether wherein the copolymer is separated from its aqueous polymerization medium by causing the copolymer and medium to form a viscous gel by either mechanical agitation or addition of a chemical gelation agent. The resulting gel is broken into particles and dried. The dried copolymer is fluorinated using fluorine gas and ground to the desired particle size. The particles are then dispersed in water in combination with a surfactant. The dispersion is useful in making very thick fluorocarbon coatings useful for lining chemical reactors, pipes for handling corrosive fluids, etc.

DETAILED DESCRIPTION

The copolymers used in the present invention are copolymers of tetrafluoroethylene and perfluoro(n-propyl vinyl ether). The amount of tetrafluoroethylene present in the copolymer is from 80–99.5 mole % and the amount of perfluoro(n-propyl vinyl ether) is from 20–0.5 mole %.

The comonomer content is low enough that the copolymers are plastics rather than elastomers, i.e., they are partially crystalline and after extrusion do not exhibit a rapid retraction to original length from a stretched condition of 2× at room temperature.

The aqueous polymerization of tetrafluoroethylene with various comonomers is well known. The reaction medium consists of water, monomers, a dispersing agent, a free-radical polymerization initiator, optionally, a chain-transfer agent and, optionally, a water-immiscible fluorocarbon phase, as described, for example, in U.S. Pat. No. 3,635,926.

Polymerization temperatures between 20°–140° C. may be employed and pressures of 1.4–7/0 MPa are ordinarily used. Generally higher temperatures and pressures are employed to increase polymerization rates. The tetrafluoroethylene and the comonomer can be fed continuously to the reaction vessel to maintain reaction pressure, or the comonomer can all be added initially and pressure is maintained with tetrafluoroethylene feed only. The monomer(s) are fed until the desired final dispersion solids level (15–50%) is achieved. The agitator speed in the reaction vessel may be held constant during polymerization or it may be varied to control polymerization rate.

Initiators commonly employed are free-radical initiators such as ammonium or potassium persulfate or disuccinic acid peroxide. The dispersing agent will be present in an amount between 0.01–0.5 percent based on weight of aqueous medium and preferably between 0.05–0.1 percent.

By the term "melt-processible" is meant that the copolymer can be processed (i.e., fabricated into shaped articles such as films, fibers, tubes, wire coatings and the like) by conventional melt-processing equipment. Such requires that the melt-viscosity of the copolymer at the processing temperature be no more than $10^7$ poise. Preferably it is in the range of $10^4$ to $10^6$ poise at 372° C.

Melt viscosities of the melt-processible polymers are measured according to Americal Society for Testing and Materials Method D-1238, modified as follows: The cylinder, orifice and piston tip are made of a corrosion-resistant alloy, such as Haynes Stellite ® 19 or Inconel ® 625. The 5.0 g sample is charged to the 9.53 mm inside diameter cylinder which is maintained at 372° C.±1° C. Five minutes after the sample is charged to the cylinder, it is extruded through a 2.10 mm diameter, 8.00 mm long square-edge orifice under a load (piston plus weight) of 5000 grams. This corresponds to a shear stress of 44.8 kPa. the melt viscosity in poise is calculated as 53170 divided by the observed extrusion rate in grams per minute.

The copolymers prepared by the foregoing aqueous polymerization process are colloidally dispersed in the polymerization medium. The polymer is recovered from the dispersion by coagulation. Normal coagulation of aqueous polymer dispersions by mechanical shear tends to give a very finely divided powder which has poor handling characteristics. Several techniques might be used to obtain the preferred larger particle sizes. The combination of mechanical agitation and certain chemical additions can be used to obtain larger, spherical particles. In the process of the invention, the aqueous dispersion is gelled with a gelling agent, such as a mineral acid, while being agitated. Preferably nitric acid is used as the gelling agent. A water-immiscible liquid is then added to the gel while continuing the agitation. The gel breaks up into separate phases of water and liquid-wetted polymer particles. The particles are then dried. The granule size is a function of the dispersion particle size, the ratio of water-immiscible liquid to polymer, and the agitation conditions. The granule size is, as desired, much larger than that achieved if the dispersion is coagulated by mechanical shear action alone. Usually, the amount of water-immiscible liquid will be 0.25 to 1.0 part per part of polymer on a dry weight basis. About 0.1 to 10 parts of $HNO_3$ per 100 parts of polymer weight can be used. Nitric acid is preferred because it is not corrosive to stainless-steel equipment and readily volatilizes in a subsequent baking step. Coagulated particles obtained by this process generally have a size between 200–3000 micrometers. The product is separated, washed and dried at 270° to 295° C. for from 2 to 9 hours. This relatively high temperature drying produces the preferred friable particles.

Preferably, the water-immiscible liquid should have a surface tension of not more than 35 dyne/cm at 25° C. and it should have a normal boiling point in the range of 30° to 150° C. Typical examples of the immiscible liquid useable in the invention are aliphatic hydrocarbons such as hexane, heptane, gasoline and kerosene, or mixtures thereof, aromatic hydrocarbons such as benzene, toluene and xylene, halogenated derivatives such as carbon tetrachloride, monochlorobenzene, the trichlorotrifluoroethanes, difluorotetrachloroethanes, and liquid oligomers of chlorotrifluoroethylene.

Other techniques may also be used to obtain the particle sizes preferred in this invention. Nucleation agents may be added to the aqueous dispersion before coagulation which would result in larger particle sizes. Small polymer particles which were obtained from mechanical coagulation may be redispersed in a two-phase liquid mixture and thus agglomerated into larger particles. The polymerization itself may be carried out with a water/immiscible liquid mixture so that particles of the desired size can be obtained directly from polymerization.

The dried particles are generally spherical and have a sphere factor less than 1.5, and preferably less than 1.2. The sphere factor is a measure of the degree of roundness of the particles. A sphere factor of 1 represents a geometrically spherical particle.

These particles contain unstable end groups. The end groups found in the untreated polymer directly from polymerization depend on the initiator used and on the presence of pH and molecular weight modifiers. For example, if ammonium or potassium persulfate is employed as the initiator, the polymer end groups are essentially all carboxylic acid (—$CO_2$). The acid end groups are found in both monomeric or dimeric forms. If a pH modifier such as ammonium hydroxide is present, then a large portion of the carboxylic acid ends may be converted to amide ends (—$CONH_2$). If a molecular weight modifier such as methanol is employed, then a portion of the ends may be carbinol (—$CH_2OH$) as well as the more stable difluoromethyl ends (—$CF_2H$). The presence of methanol can also lead to methyl ester ends (—$CO_2CH_3$). Vinyl ends (—$CH=CF_2$) are generally not a direct result of polymerization but are formed as a result of decarboxylation of the initially formed carboxylic acid ends. Acid fluoride ends (—COF) generally result from air oxidation of the vinyl ends or the carbinol ends. All of the end groups described above (except —$CF_2H$) are considered to be thermally and/or hydrolytically unstable. This is what is meant by the term "unstable end groups". They have a tendency to cause bubbles or voids when dispersions of the copolymer are used to form coatings. These voids can be detrimental to the corrosion and chemical resistance and porosity properties of fabricated articles. It is desirable to have less than 80 of these unstable ends per $10^6$ carbon atoms in the polymer.

The unstable end groups described above may be reduced or eliminated by treatment of the polymer with fluorine. The fluorination may be carried out with a variety of fluorine radical generating compounds but preferably the polymer is contacted with fluorine gas. Since reactions with fluorine are very exothermic, it is preferred to dilute the fluorine with an inert gas such as nitrogen. The level of fluorine in the fluorine/inert gas mixture may be 1 to 50 volume % but is preferably 10-30%. Any reaction temperature between 0° C. and the polymer melting point may be used but a temperature range between 130° and 200° C. appears to be practical to permit reasonable reaction times (1 to 5 hours under fluorine). It is preferred to agitate the polymer to expose new surfaces continuously. The gas pressure during fluorination may range from 80 to 300 psi ($55 \times 10^4$Pa to $200 \times 10^4$Pa).

Most of the unstable end groups are converted to perfluoromethyl (—$CF_3$) ends by the fluorine. The acid fluoride ends are the most resistant to fluorine but will react at sufficiently high temperature or with sufficient time.

The preferred copolymers should have a melting heat ratio greater than 1.2. By melting heat ratio is meant the ratio of the heat of melting on its first melting to the heat of melting recorded on a second melting. This is an indication that the particles have not been melted completely.

End Group Analysis

The end groups in a fluorocarbon polymer are determined from the infrared spectrum of compression molded films. This technique has been described in previous patents such as U.S. Pat. No. 3,085,083.

The quantitative measurement of the number of end groups is obtained using the absorptivities measured on model compounds containing the end groups of interest. The end groups of concern, the wavelengths involved, and the calibration factors determined from model compounds are shown below:

| End Group | Wavelength, micrometers | Calibration Factor (CF) |
|---|---|---|
| —COF | 5.31 | 406 |
| —$CO_2H$(M) | 5.52 | 335 |
| —$CO_2H$(D) | 5.64 | 320 |
| —$CO_2CH_3$ | 5.57 | 368 |
| —$CONH_2$ | 2.91 | 914 |
| —$CF=CF_2$ | 5.57 | 635 |
| —$CH_2OH$ | 2.75 | 2220 |

M = Monomeric, D = Dimeric

The calibration factor is a mathematical conversion to give end group values in terms of ends per $10^6$ carbon atoms. The concentration of each type of end in a polymer film may generally be obtained from this equation:

$$\text{End Groups per } 10^6 \text{ carbon atoms} = \frac{\text{absorbance} \times CF}{\text{film thickness}}$$

where film thickness is in millimeters (±0.003 mm).

Some of the absorbance peaks may interfere with one another when —$CO_2H$(D), —$CO_2H$(M), and —$CF=CF_2$ ends are all present. Corrections have been developed for the absorbances of —$CO_2H$(D) (hydrogen-bonded carboxylic acid dimer) and the —$CF=CF_2$ ends. These are as follows (where $\mu$ is wavelength in micrometers):

$$\frac{5.46\mu \text{ absorbance} - (0.3 \times 5.58\mu \text{ absorbance})}{0.9\perp} =$$

corrected absorbance for —$CO_2H$(D)

$$\frac{5.57\mu \text{ absorbance} - (0.3 \times 5.58 \text{ absorbance})}{0.9\perp} =$$

corrected absorbance for —$CF=CF_2$

The presence of —$CONH_2$ or —$CO_2CH_3$ may also interfere with the acid and —$CF=CF_2$ absorbances. Since these groups are generally the result of additives to polymerization their presence is generally predictable. A suspicion of —$CONH_2$ absorbance in the vicinity of 5.6 micrometers can be checked by searching for the auxiliary —$CONH_2$ band at 2.91 micrometers.

The polymer films (0.25 to 0.30 mm thick) are scanned on a Perkin-Elmer 283B spectrophotometer with a film of the same thickness, and known to contain none of the ends under analysis, in the instrument reference beam. The instrument is set up with a Response Time setting of 1, a Scan time setting of 12 minutes, Ordinate Expansion of 2, a Slit Program of 7, and an Auto-Chek Gain control of 20%. The films are then scanned through the pertinent regions of the spectrum making sure that adequate base lines are established on each side of the pertinent absorbances.

The polymer films are generally compression molded at 270°–350° C. The presence of certain salts, particularly alkali metal salts, may cause end group degradation within this temperature range. If these salts are present, the films should be molded at the lowest possible temperature.

PERFLUOROPROPYLVINYL ETHER (PPVE) CONTENT DETERMINATION

The PPVE content in the melt-processible TFE/PPVE copolymers described herein is also determined by infrared spectroscopy. The ratio of absorbance at 10.07 micrometers to that at 4.25 micrometers is determined under a nitrogen atmosphere using films approximately 0.05 mm thick. The films are compression molded at 350° C., then immediately quenched in ice water. This absorbance ratio is then used to determine percent PPVE by means of a calibration curve established with reference films of known PPVE content. F19 NMR is used as the primary standard for calibrating the reference films.

AVERAGE PARTICLE SIZE

U.S. Pat. No. 3,929,721 describes a dry-sieve analysis procedure. The "average particle size" is determined by a dry-sieving procedure in accordance with ASTM Procedure D-1457-81a (12.3.3) modified as follows. The 203 mm diameter sieve set is assembled in order, with the largest mesh opening on top. From the listing of U.S.A. Standard Testing Sieve sizes (ASTM E-11 Specification), four to eight adjacent sieves are selected with openings between the limits of 6 mesh and 200 mesh and which bracket the range into which the average particle size is expected to fall.

A 40 to 60 g representative portion of the sample to be tested, preferably obtained using a sample splitter and weighed to the nearest 0.01 g, is charged to the top screen. The screen set is shaken in a sieve shaker (typically a "Ro-Tap ®" shaker obtained from Fisher Scientific Co., Cat. No. 4-909) for about 10 minutes. After shaking, the net weight of material retained on each sieve is determined to the nearest 0.01g.

The weight average particle size is determined based on plotting the cumulative percentage retained vs. sieve opening on log-probability paper as described in ASTM method D-1921-63, or by equivalent computer interpolation of these data. The average particle size in micrometers is read from the plot at the 50th percentile (D50) abscissa of cumulative weight percentage retained.

DSC ANALYSIS

DSC analyses are carried out with a Du Pont Model 1090 Thermal Analyzer using a Model 910 DSC cell base and the Du Pont General Analysis Program, Version 1.0. The instrument is calibrated as recommended by the manufacturer, using a 10 mg indium standard. Polymer sample size is 6 to 10 mg, crimped into an aluminum capsule. Different heating and cooling cycles are used depending upon the melting point of the sample. Samples are scanned twice across the melting endotherm at 10° C. per minute from a temperature which is 90°±5° C. below to a temperature 40°±5° C. above the melting endotherm peak temperature. Between the first and second scanning of the endotherm, the sample is cooled from the maximum to the minimum scan temperature at a rate of 10° C./min. The "melting endotherm peak temperature" is defined as the peak temperature of the first melting endotherm. The heats of melting ($H_1$ and $H_2$) are calculated from the first and second melting scans, respectively. The "melting heat ratio" (Hm ratio) is defined as $H_1/H_2$. The melting heats $H_1$ and $H_2$ are determined by instrumental integration using a base line from 80° C. below to 30° C. above the peak temperature. The "melt onset temperature" is determined graphically by plotting the derivative of the first melting scan using the DuPont General Analysis Program, Version 1.0. It is defined as the temperature where the expanded derivative curve first increases above the zero base line (on the low temperature edge of the melting curve) by 0.2 mW/min.

The coatings of the present invention generally are applied by spraying an aqueous dispersion of the fluorinated resin particles. Generally the dispersion will contain from 30 to 55 weight percent of the fluorinated resin particles. The advantage of the present invention is that relatively thick layers of the fluorinated resin can be applied such as 3 to 5 mils ($7.6 \times 10^{-5}$ to $12.7 \times 10^{-5}$ m) layers and successive layers built up to a thickness of 25–40 mils ($63.5 \times 10^{-5}$ to $100 \times 10^{-5}$ m). The individual layers are cured by heating prior to applying the next layer. Generally the curing is done by heating at 120° to 205° C. for 5 to 30 minutes followed by heating at 315° to 370° C. for 5 to 30 minutes.

The multi-layer coating produced by the present invention are free of bubbles and are useful in coating the inside of reactors, pipes, and other apparatus used in handling, storing, and making corrosive chemicals.

EXAMPLE 1

An aqueous dispersion of tetrafluoroethylene (TFE) with 1.3 mole % perfluoropropyl vinyl ether (PPVE) copolymer was prepared in accordance with U.S. Pat. No. 3,635,926. This dispersion, containing 26.9 weight % copolymer, was obtained by polymerizing the monomers using ammonium persulfate initiator, ammonium perfluorocaprylate surfactant and ethane chain-transfer agent in the presence of ammonium hydroxide pH modifier and Freon ® 113 as a water-immiscible phase.

The above TFE/PPVE copolymer dispersion was coagulated at 35° C. using agitation, and adding 5.8 parts of 60 weight % nitric acid and 85.5 parts of Freon ® 113 per 100 parts by weight of copolymer (dry basis) were added.

The resulting granules were washed, with agitation, 3 times with 20°–25° C. demineralized water, followed by a wash heated to 60° C. to remove the Freon ® 113, and by a final water wash at 20°–40° C. The resulting polymer was separated from the wash water and dried at 287° C. for 3.5 hours in a circulating air oven.

One batch of the polymer was fluorinated at 195° C. using fluorine gas at 290 psi ($200 \times 10^4$ Pa) after 4 hours at which time the reaction was shut down. The copolymer was then milled in a pin mill to a D-50 of 25 microns.

Six g octyl phenoxy polyethoxy ethanol were added to 300 g water and stirred to dissolve. The resulting liquid was transferred to a laboratory high speed blender (Osterizer) set at the highest speed. The above copolymer (300 g) was added over a three minute period and shear continued an additional three minutes. The dispersion had a viscosity of 19–20 poise. This is dispersion A.

Another batch of copolymer which had been heat treated at 290° C. for 6 hours was fluorinated using fluorine gas at 195° C. for 4 hours wherein the initial pressure was 210 psi (145×10⁴Pa) which dropped to 110 psi (760×10³Pa) at the end of the run. The resulting fluorinated polymer was then pin milled to a D 50 of about 25 microns.

Six g of octyl phenoxy polyethoxy ethanol were added to 300 g water and stirred to dissolve. The resulting liquid was transferred to a laboratory high speed blender (Osterizer) set at its highest speed. The above copolymer (300 g) was added over a three minute period and shear continued an additional three minutes. The dispersion had a viscosity of 19-20 poise. This is dispersion B.

A third dispersion was prepared as above using the non-fluorinated copolymer which had a D 50 of approximately 25 microns. This is dispersion C.

On grit blast Aluminum panels, 3.0 mils/coat of A, B, C were sprayed, baking each coat 150° C./10'; 343° C./20. Building 3.0 mils/coat was repeated until bubbling was evident.

|   | DRY FILM THICKNESS | BUBBLING |
|---|---|---|
| A | 34 mils | No |
| B | 30 mils | No |
| C | 9–13 mils | Yes |

A and B did not show bubbling under 40x magnification at the stated builds and the experiment was terminated. C showed bubbling visible to the naked eye and bubbles caused the variable film build as stated.

I claim:

1. A process for treating a melt-processible, substantially non-elastomeric copolymer of 80 to 99.5 mole percent tetrafluoroethylene and 0.5 to 20 mole percent perfluoro(n-propyl vinyl ether) comprising
   A. coagulating said copolymer from its aqueous polymerization medium to form a viscous gel,
   B. breaking the above gel into granules by addition of a water-immiscible liquid accompanied by mechanical agitation,
   C. separating the coagulated copolymer from the aqueous medium,
   D. drying the copolymer at about 270° to 295° C. for 2 to 9 hours,
   E. subjecting the copolymer to an atmosphere containing fluorine gas until the total number of unstable and groups is less than 80 per $10^6$ carbon atoms,
   F. grinding the copolymer to a number average particle size of from 5 to 100 microns,
   G. forming an aqueous dispersion of the fluorinated copolymer.

2. The process of claim 1 wherein the particles are ground to a number average particle size of 20 to 40 microns in step F.

3. An aqueous dispersion of 20 to 60 wt. % of a melt processible, substantially non-elastomeric copolymer of 80 to 99.5 mole percent tetrafluoroethylene and 0.5 to 20 mole percent perfluoro(n-propyl vinyl ether) having a particle size of from 5 to 100 micron, which has been fluorinated to where there are less than 80 unstable end groups per $10^6$ carbon atoms.

4. A process comprising applying successive bubble free layers of the dispersion of claim 3 to a substrate and thermally curing each layer prior to applying the next layer.

5. The process of claim 4 wherein the dispersion is applied by spraying.

6. A coated article prepared by the process of claim 4 wherein the coating is at least 25 mils in thickness.

* * * * *